United States Patent [19]

McDorman, Sr.

[11] 4,132,093
[45] Jan. 2, 1979

[54] SECURITY DEVICE FOR TRAILER COUPLING PIN

[76] Inventor: Robert L. McDorman, Sr., P.O. Box 473, La Porte, Tex. 77571

[21] Appl. No.: 825,823

[22] Filed: Aug. 18, 1977

[51] Int. Cl.² ............................................. E05B 65/12
[52] U.S. Cl. ....................................... 70/231; 70/165
[58] Field of Search ................. 70/34, 37, 57, 58, 229, 70/231, 232, 258, 360, 361, 417, DIG. 58

[56] References Cited

U.S. PATENT DOCUMENTS

| | | | |
|---|---|---|---|
| 1,764,367 | 6/1930 | Szymanski | 70/232 X |
| 2,350,633 | 6/1944 | Obenauer | 70/232 |
| 2,554,306 | 5/1951 | Mack | 70/232 |
| 3,112,636 | 12/1963 | McIntyre | 70/232 |
| 3,386,274 | 6/1968 | McIntyre | 70/232 |
| 3,415,085 | 12/1968 | Eble | 70/232 |
| 3,600,914 | 8/1971 | Johnson | 70/232 |
| 3,706,211 | 12/1972 | Owen | 70/37 |
| 3,798,938 | 3/1974 | McCullum | 70/417 |
| 3,832,872 | 9/1974 | Gerlach | 70/232 |
| 3,922,897 | 12/1945 | Mickelson | 70/232 |

Primary Examiner—J. Franklin Foss
Attorney, Agent, or Firm—Arnold, White & Durkee

[57] ABSTRACT

The coupling pin of the trailer of a tractor-trailer rig is provided with a theft prevention device for preventing the unauthorized coupling of unattended trailers. The device includes a truncated conical housing having a cylindrical sleeve which is secured to the inner base of the cone and is adapted to receive the coupling pin. The coupling pin is held within the sleeve by means of a pair of opposed, spring-biased locking jaws which normally protrude through a pair of opposed slots in the sleeve. In order to engage the reduced diameter portion of the coupling pin. The locking jaws are mounted on a pair of U-brackets. The brackets carry a pair of camming surfaces which are engaged by the wing cams of a key-operated lock. The lock is preferably recessed within the housing so that it cannot be sheared off during use. The invention has the additional utility of serving as a safety device for preventing the movement of a trailer during unloading operations.

4 Claims, 5 Drawing Figures

SECURITY DEVICE FOR TRAILER COUPLING PIN

BACKGROUND OF THE INVENTION

1. Field of the Invention

The invention relates to devices for preventing the unauthorized coupling of tractors to unattended trailers.

2. Description of the Prior Art

It is well known that the trailers of tractor-trailer rigs are often parked in isolated spots or left unattended. In recent years there has been an increasing problem with the hijacking of such vehicles by unauthorized persons. Aside from the theft prevention problem, there is a further safety problem associated with the naked exposure of coupling pins at loading docks and the like. In these instances it is possible for a tractor to be coupled to a trailer while such trailer is being unloaded by means of a forklift or the like. In such instances severe injury has been inflicted on persons who were unloading a trailer when it was mistakenly pulled away from the dock area.

Thus, there is an acute need in the trucking industry for a simple, safe and reliable device for rendering trailers of tractor-trailder rigs insusceptible to coupling with unauthorized vehicles.

SUMMARY OF THE INVENTION

In accordance with the present invention there is provided a device which a single operator may lock in place over the coupling pin of the trailer of a tractor-trailer rig thereby preventing unauthorized coupling to such trailer. In a preferred embodiment the device of the present invention includes a truncated conical housing having a solid base and made from a high chrome alloy steel. A cylindrical sleeve member is welded to the inside of the base of the cone and extends upwardly therein for substantially the height of the cone. The sleeve has an inside diameter slightly greater than the outside diameter of a conventional coupling pin so that it may slidably receive the coupling pin. The sleeve is provided with a pair of opposed recesses which receive a pair of spring-biased jaw elements whch extend through the wall of the sleeve and engage the reduced diameter portion of the coupling pin to lock the pin in place. The jaw elements are secured to a pair of pivotally mounted U-shaped carriers which are normally spring biased so as to urge the jaw elements inwardly through the sleeve recesses. The carriers include camming surfaces which are adapted to engage a wing cam operable by means of a lock.

In operation, the device may be slid onto the coupling pin whereby the jaw elements automatically retract and then lock within the reduced diameter portion of the coupling pin. Once locked in place, the device may be removed only by means of an authorized person having a key. If an unauthorized tractor backs into engagement with a trailer carrying the device, the coupling pin mating element of the tractor will simply slide along the outer surface of the cone thereby raising the cone and coupling pin and preventing any damage to the trailer.

A primary feature of the invention is the provision of an anti-theft device for preventing the unauthorized taking of an unattended trailer.

A further feature of the invention is the provision of a device which may be secured to the coupling pin of a trailer while it is being unloaded at a dock to prevent the removal of the trailer.

Another feature of the invention is the provision of a relatively simple, safe and reliable security device which may be secured in place and removed by a single operator.

Yet another feature of the invention is the provision of a lock-on cover for a coupling pin that will prevent damage to the trailer if an unauthorized coupling is attempted.

DESCRIPTION OF THE PREFERRED EMBODIMENT

Figure 1:
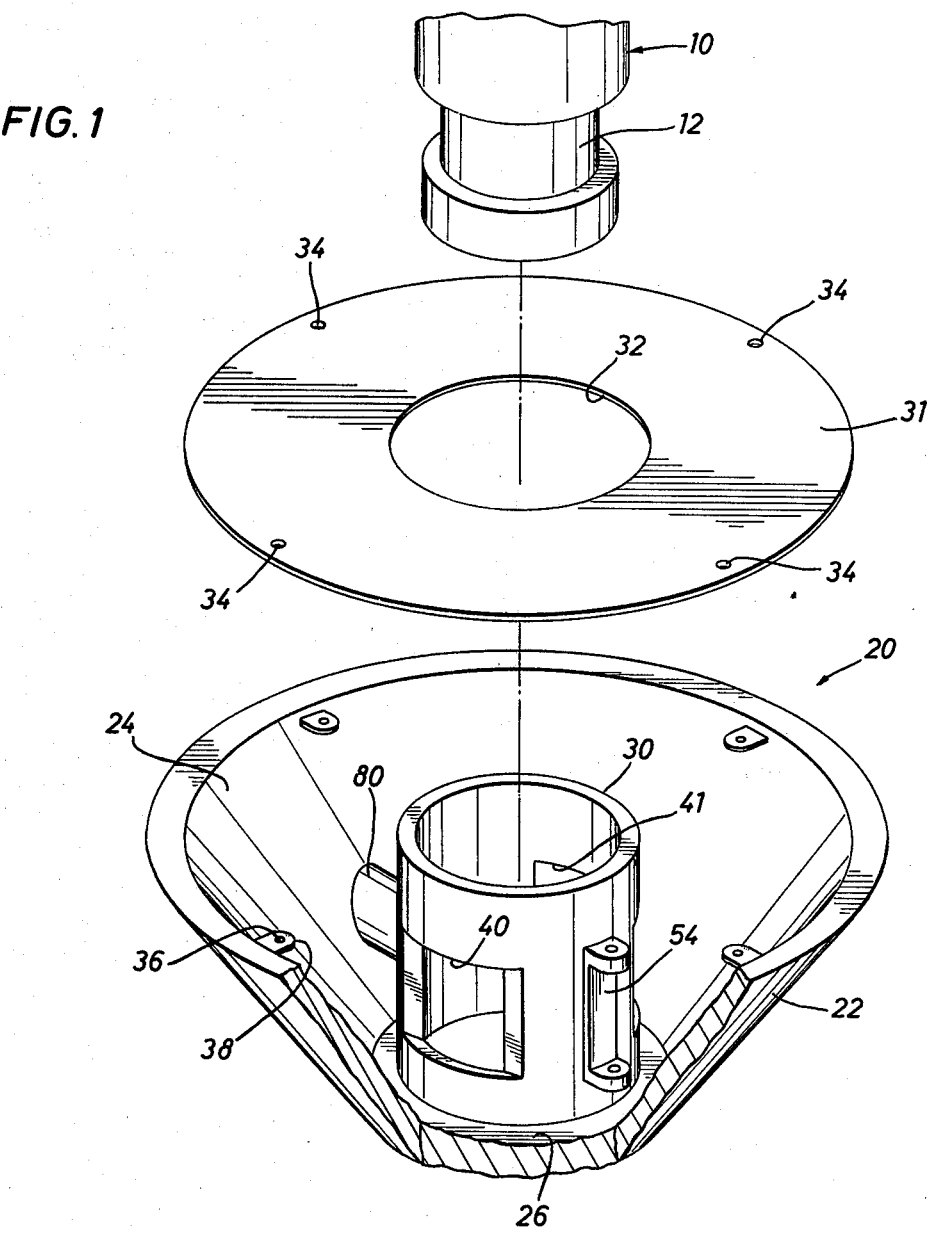
FIG. 1 is a partially exploded perspective view of the security device with a portion of the housing cut away and portions of the lock assembly removed for purposes of illustration.
Figure 5:
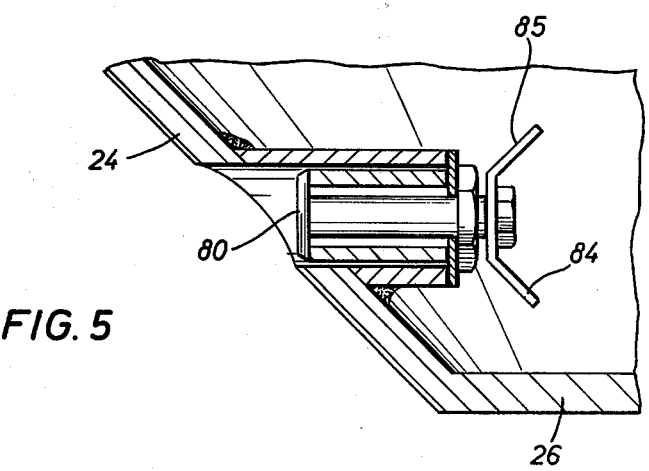
FIG. 5 is a vertical section view through the lock and a portion of the housing.

Referring to the drawings and in particular to FIG. 1, there is shown a coupling pin 10 of the type normally attached to and downwardly projecting from the front portion of the trailer of a tractor-trailer rig. The coupling pin is substantially cylindrical and includes a reduced diameter portion 12.

The device for securement over the coupling pin to serve as a lock-on cover is generally designated by the reference numeral 20. Device 20 includes a truncated conical housing 22 which comprises a sloped wall portion 24 and a flat base portion 26. Housing 20 is made from a material which will resist relatively high impacts, and in a preferred embodiment, the housing is made from a high chrome alloy steel.

A cylindrical sleeve 30 is welded to the inside of base 26 and extends substantially the entire height of device 20. Sleeve 30 has an inside diameter slightly larger than the outside diameter of coupling pin 10 and is adapted to receive the coupling pin therein after it passes through a cover 31. As shown in FIG. 1, cover 31 is a flat sheet member which includes a central opening 32 for passing the coupling pin and four holes 34 which align with holes 36 in boss elements 38 for securement of the cover to the cone by means of fasteners (not shown).

The lock assembly 39 for locking coupling pin 10 within sleeve 30 will now be described in detail with reference to FIGS. 1-4. Sleeve 30 includes a pair of opposed horizontal slots 40, 41 which are adapted to receive a pair of jaw elements 42 and 44 respectively. Jaw elements 42, 44 include sloping cam surfaces 46, 47 the function of which will be explained in detail below. Elements 42, 44 are secured by welding or the like to a pair of jaw carriers 50, 52 whch are pivotally mounted on a U-bracket 54 by means of a retainer pin 56. The rear face 60 of U-bracket 54 is secured by welding or the like to the exterior surface of sleeve 30 so that carriers 50, 52 substantially surround sleeve 30. Carriers 50, 52 are spring biased inwardly by means of a pair of coil springs 64, 66. Springs 64, 66 are received within bosses 68, 70 on the carriers and within bosses 72, 74 on the inners surface of cone 22.

Figure 2:
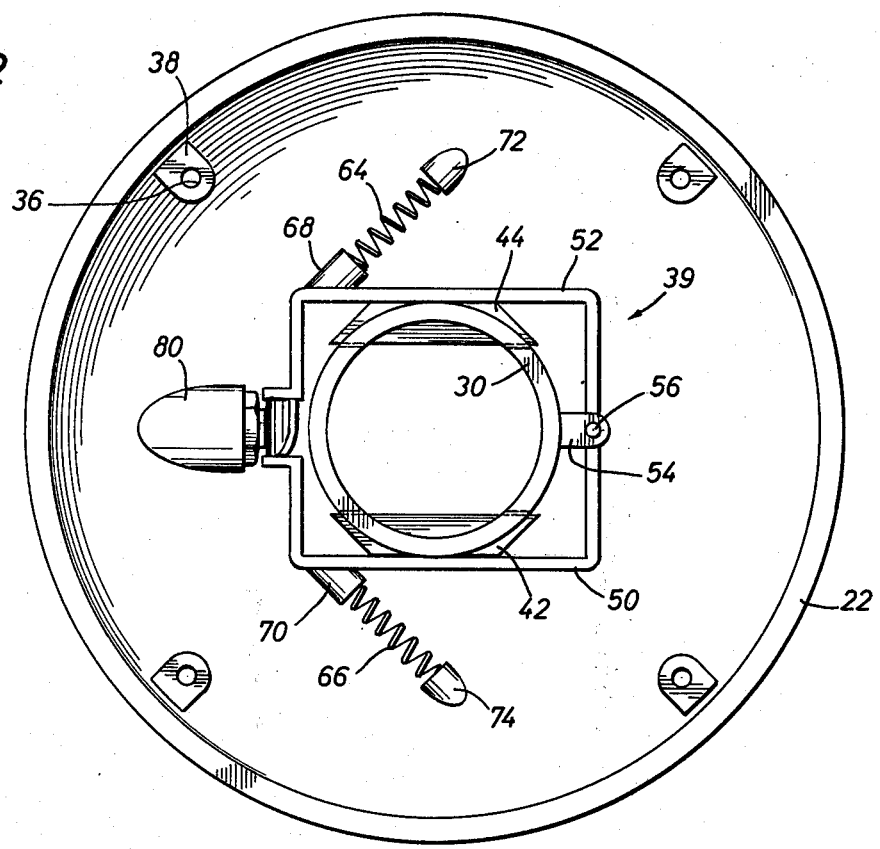
FIG. 2 is a plan view of a portion of the device in a locked position.

Springs 64, 66 normally urge jaw elements 42, 44 to the locked position illustrated in FIG. 2. With lock assembly 39 in the position shown in FIG. 2 the device 20 may be lifted into engagement with a coupling pin whereby the pin slides within sleeve 30 until it engages cam surfaces 46, 47, thereby forcing the jaw elements outwardly against the bias of springs 64, 66. When the coupling pin is fully inserted into sleeve 30 the jaw elements 42, 44 are urged into the reduced diameter portion 12 of the coupling pin thereby locking the device 20 to the pin 10.

Figure 3:
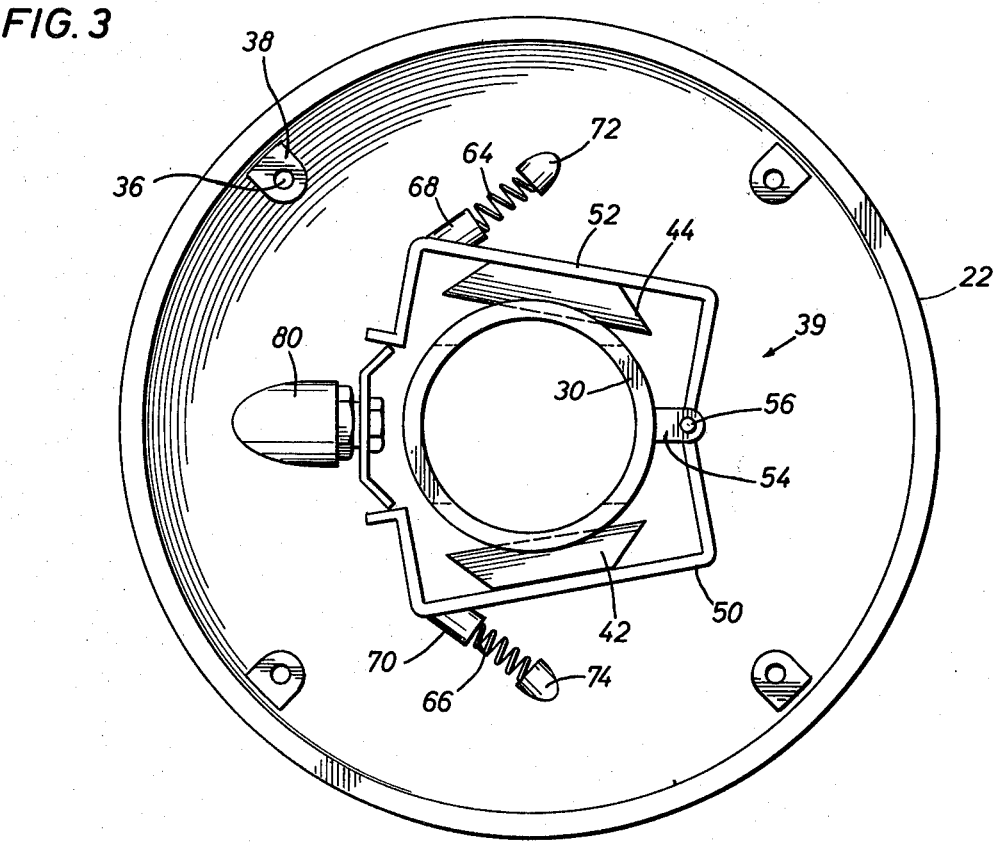
FIG. 3 is a view similar to FIG. 2 showing the unlocked position.
Figure 4:
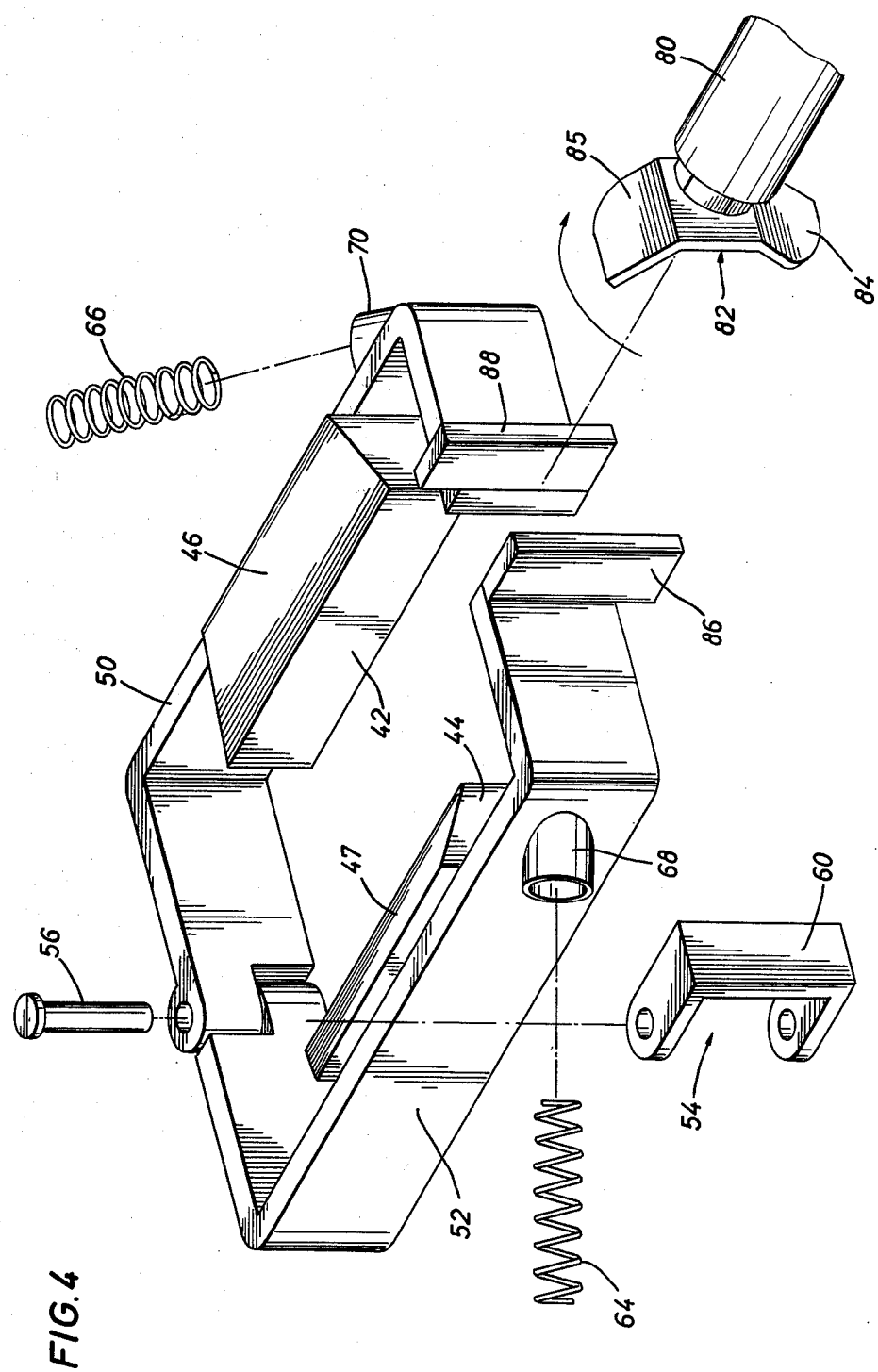
FIG. 4 is a partially exploded perspective of the lock assembly.

With reference to FIGS. 3 and 4 the unlocking of device 20 will now be described. Lock assembly 39 includes a tubular key-operated lock 80 whch is operable to rotate a wing cam 82 having wing elements 84, 85. Wings 84, 85 are adapted to engage a pair of cam surfaces 86, 88 which are, in turn, secured to pivotally mounted carriers 50, 52. Thus, upon actuation of lock 80 and the turning of wing cam 82 (in a clockwise direction as illustrated by the arrows in FIG. 4), cam surfaces 86, 88 are urged outwardly against the bias of springs 64, 66 to the position illustrated in FIG. 3 where jaw elements 42, 44 are fully withdrawn from recesses 40, 41. In this position the device 20 may be removed from coupling pin 10 thereby exposing the coupling pin for authorized coupling with a tractor.

In the preferred embodiment the cone, cylindrical sleeve and jaw elements are made from a high chrome alloy steel. In the alternative, these elements have been made from a conventional mild steel; however, any suitable impact resistant material may be used. Although the carriers 50, 52 have been illustrated as together forming a rectangle, the carriers may be curved on a radius at the corners or otherwise formed so that they may be easily stamped. In the preferred embodiment the inside diameter of sleeve 30 has been found to be optimized at 2⅞ inches with slots having a height of approximately 1½ inches.

What is claimed is:

1. A security device adapted for locking engagement over the coupling pin of the trailer of a tractor-trailer rig comprising:
    a truncated conical housing having a solid base at its tapered end;
    a sleeve secured to the inside surface of said base and extending therefrom for substantially the height of said housing, said sleeve having an inside diameter larger than the outside diameter of the coupling pin to be covered to provide a sliding fit between the sleeve and the coupling pin, said sleeve having a pair of opposed horizontal slots intermediate its length;
    a pair of jaw elements adapted to fit within said slots and providing opposed locking surfaces on their lower faces when fully inserted into said slots, said jaw elements having upper cam surfaces for engaging the coupling pin as it is inserted into said sleeve for camming the jaw elements outwardly during such insertion;
    means for biasing said jaw elements into said slots comprising pivotally mounted jaw carriers substantially surrounding said sleeve and secured to said jaw elements and resilient means for urging said jaw carriers inwardly;
    a lock recessed in the sidewall of said housing and having rotatable cam elements operable to engage mating surfaces on said jaw carriers to urge said jaw carriers outwardly against the bias of said resilient means; and
    a cover plate detachably secured to the larger end of said conical housing and having a central opening for passing the coupling pin.

2. A security device as claimed in claim 1 wherein said jaw carriers are pivotally mounted by a U-bracket secured to the external surface of said sleeve.

3. A security device as claimed in claim 1 wherein the inside diameter of said sleeve is on the order of 2⅞ inches and the opposed horizontal slots have a height on the order of 1½ inches.

4. A security device as claimed in claim 1 wherein said rotatable cam elements comprise a wing cam.

* * * * *